United States Patent [19]

Heismann et al.

[11] Patent Number: 4,614,130
[45] Date of Patent: Sep. 30, 1986

[54] TENSIONING CONTROL FOR FLEXIBLE CABLE

[75] Inventors: Richard A. Heismann, Knoxville; Warren W. Pendry, Bonfield, both of Ill.

[73] Assignee: Outboard Marine Corporation, Waukegan, Ill.

[21] Appl. No.: 680,384

[22] Filed: Dec. 11, 1984

[51] Int. Cl.<sup>4</sup> ............................................. G05G 7/04
[52] U.S. Cl. ..................... 74/501 R; 74/97; 74/491; 74/506; 74/517; 74/526
[58] Field of Search ........... 74/97, 100 R, 491, 501 R, 74/506, 517, 526, 501.6, 502.2; 188/166

[56] References Cited

U.S. PATENT DOCUMENTS

| 136,581 | 3/1873 | Browne et al. .................. 74/506 |
| 614,519 | 11/1898 | Tramm . |
| 652,055 | 6/1900 | Taggart .......................... 74/506 |
| 728,057 | 5/1903 | Warner . |
| 731,671 | 6/1903 | Dring . |
| 757,159 | 4/1904 | Valiquet ......................... 188/166 |
| 1,070,567 | 8/1913 | Wight . |
| 1,343,994 | 6/1920 | Bates . |
| 1,367,318 | 2/1921 | Horton . |
| 1,396,304 | 11/1921 | Warring . |
| 1,496,610 | 6/1924 | Shepard . |
| 1,605,340 | 11/1926 | Gallagher et al. ............... 188/166 |
| 2,329,898 | 9/1943 | Henning ........................... 74/97 |
| 2,464,096 | 3/1949 | Orscheln .......................... 74/518 |
| 2,544,811 | 3/1951 | Straub ............................. 74/97 |
| 2,865,220 | 12/1958 | Bayley ............................ 74/471 |
| 2,868,034 | 1/1959 | Cole ............................... 74/487 |
| 4,075,907 | 2/1978 | Petrzelka ......................... 74/523 |
| 4,170,151 | 10/1979 | Olson et al. .................. 74/527 X |
| 4,259,879 | 4/1981 | Watarai ....................... 74/489 X |
| 4,292,858 | 10/1981 | Lipshield ..................... 74/518 X |
| 4,351,198 | 9/1982 | Hansen ...................... 74/501 R X |
| 4,366,607 | 1/1983 | MacCuaig ................... 254/243 X |

FOREIGN PATENT DOCUMENTS 2001919  2/1979  United Kingdom ............ 74/501 R

Primary Examiner—Allan D. Herrmann
Attorney, Agent, or Firm—John T. Synnestvedt; Richard D. Weber

[57] ABSTRACT

An over center tensioning and locking control for a cable actuated mechanism includes a control bracket on which an actuating lever is pivotally mounted. The cable to be controlled is connected to said actuating lever and rides on an arcuate cam surface thereon. A spring linkage pivotally connected at one end to the bracket and at the other end to the actuating lever passes over center to lock the actuating lever in a cable tensioning position.

12 Claims, 6 Drawing Figures

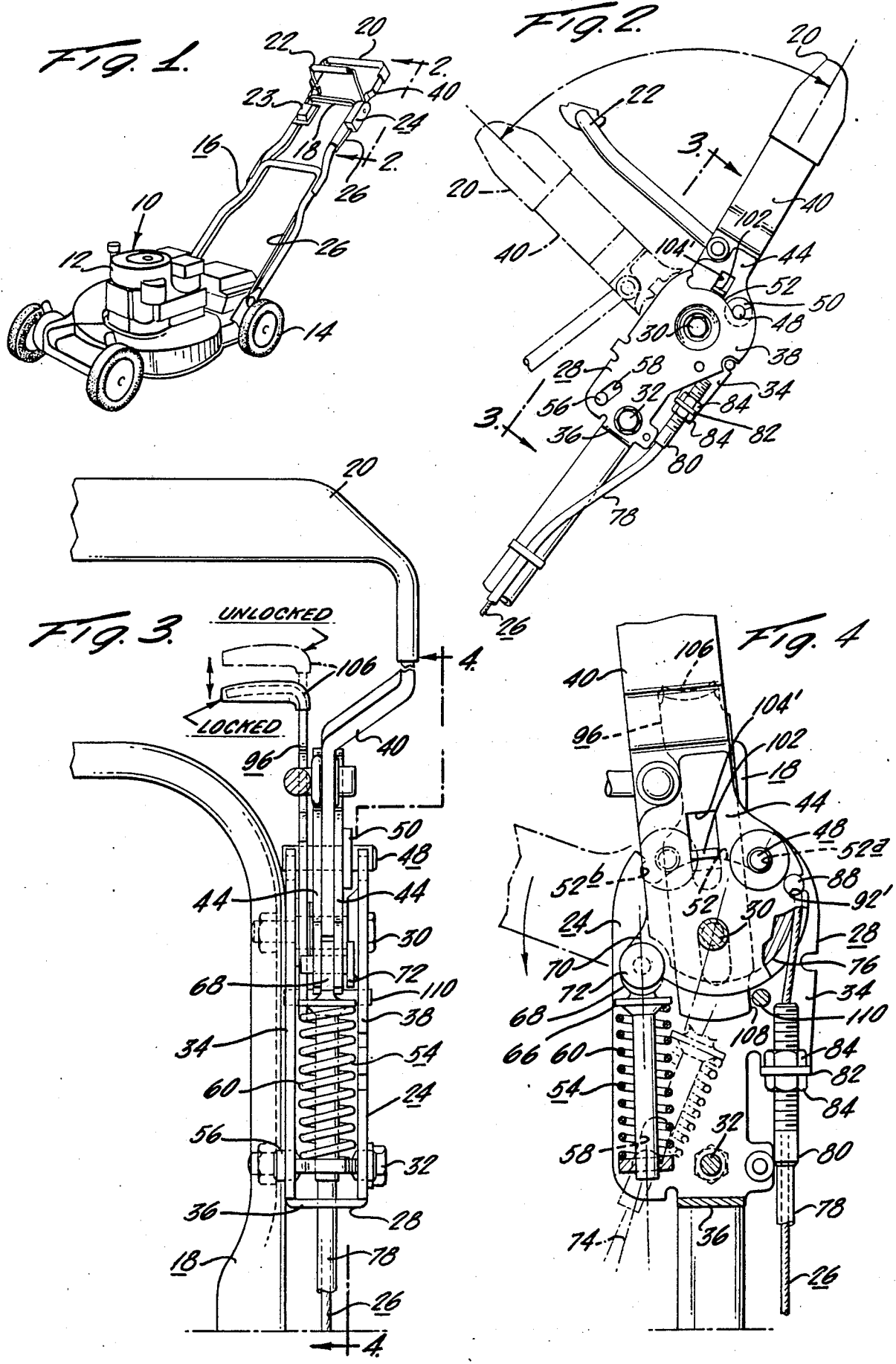

TENSIONING CONTROL FOR FLEXIBLE CABLE

BACKGROUND OF THE INVENTION

The present invention relates generally to control devices for flexible cable actuated mechanisms and relates more particularly to a lever actuated control for applying a predetermined tension to a flexible cable and locking the cable in a tensioned condition.

Flexible cable and particularly sheathed flexible cable has been widely used in a variety of mechanisms which are actuated by the application of a tension force. For example, mechanical brakes in automotive vehicles commonly use a flexible cable to actuate the parking brakes.

A disadvantage of flexible cable as contrasted to a solid actuating linkage such as a metal rod is its inability to transmit a compression force. Furthermore, flexible cable is slightly resilient and tensioning mechanisms commonly used with cables are thus of the ratchet type wherein the cable tension is reestablished and regauged upon each tensioning of the cable.

In control linkages where solid rods are employed between the actuating control and the mechanism actuated, it is conventional to utilize an over center lock both for tensioning and compressing the control rod, for example as used in a transmission control. Such an arrangement is not suitable for use with a flexible oable since the cable tension may not be capable of holding the control linkage over center. Furthermore, a convention rod type over center mechanism could not be employed in circumstances wherein slack may develop in the cable.

SUMMARY OF THE INVENTION

In the present control, an actuating lever is pivotally connected to a fixed bracket. An arcuate cam surface is provided on the actuating lever, and the cable end is attached to the actuating lever with an end portion of the cable riding on the cam surface. Stops on the bracket limit the pivotal movement of the actuating lever between cable relaxed and cable tensioned positions. A spring linkage is pivotally mounted at one end to the bracket and at the other end to the actuating lever. The spring linkage is positioned so that the spring will go "over center" when the actuating lever is moved from the cable relaxed to the cable tensioned position. The spring linkage will accordingly hold the actuating lever in the cable tensioned position and maintain a predetermined tension on the cable. Should the cable tension be interrupted for any reason, the spring linkage will nonetheless hold the actuating lever in the cable tensioned position.

It is accordingly a first object of the present invention to provide a tensioning and locking control for applying a predetermined tension to a flexible cable.

Another object of the invention is to provide a cable control as described which will remain in the locked position regardless of variation in tension or the absence of tension on the control cable.

A further object of the invention is to provide a control as described of a relatively simple, lightweight construction which can be economically fabricated.

Still another object of the invention is to provide a control as described which can be easily operated and readily adjusted to provide the desired cable tension.

Additional objects and advantages of the invention will be more readily apparent from the following detailed description of a preferred embodiment thereof.

BRIEF DESCRIPTION OF THE DRAWINGS

FIG. 1 is a perspective view of a powered lawn mower employing a cable control assembly in accordance with the present invention;

FIG. 2 is an enlarged fragmentary side elevational view taken along line 2—2 of FIG. 1;

FIG. 3 is an enlarged fragmentary view taken along line 3—3 of FIG. 2 showing internal details of the control assembly;

FIG. 4 is a view taken along line 4—4 of FIG. 3 showing the actuating lever in the cable relaxed position;

DESCRIPTION OF THE PREFERRED EMBODIMENT

Figure 5:
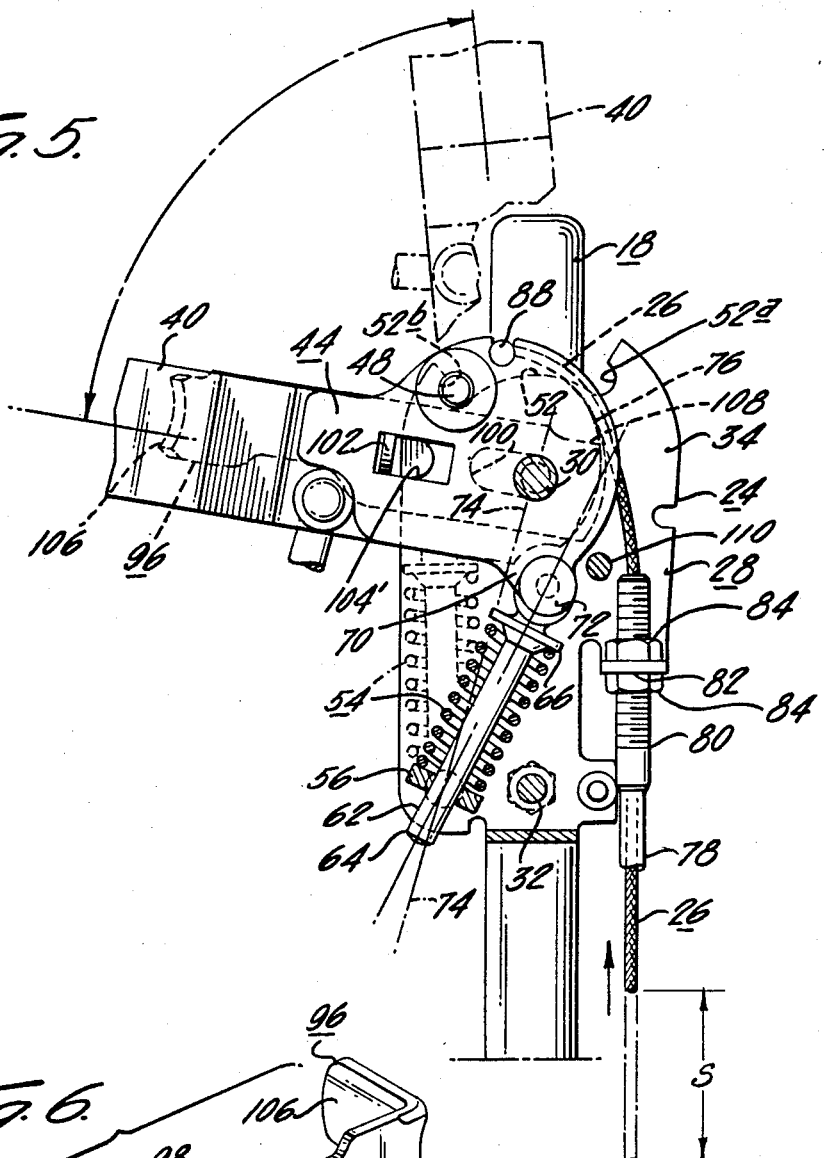
FIG. 5 is a view similar to FIG. 4 showing the actuating lever in the cable tensioned position.

Although the present cable tensioning and locking control may be employed in any mechanism wherein a flexible cable is to be tensioned and locked in a tensioned condition, the invention finds ready usage in controlling the drive mechanism of a lawn mower and is accordingly illustrated and described in that environment.

Referring to the drawings and particularly FIG. 1 thereof, a lawn mower generally designated 10 having an engine 12 and rear drive wheels 14 is illustrated. A handle assembly 16 includes a lower handle 18 attached to the rear of the mower deck and an upper handle 20 pivotally connected to the upper end of the lower handle. A blade or engine cutoff lever 22 pivotally mounted on the upper handle 20 is connected by control linkage 23 to the blade clutch or engine ignition, depending on the type of safety feature employed.

In the mower illustrated, the application of power to the rear drive wheels 14 is effected by pivoting the upper handle 20 forwardly as illustrated in FIG. 2, which pivotal motion, through the control assembly 24 in accordance with the present invention, applies tension to a control cable 26 assembly connected with the wheel drive mechanism. The present invention is directed to the cable tensioning and locking control assembly 24 which is considered below in detail.

The control assembly 24 includes a control bracket 28 attached to the lower handle 18 by upper and lower bolts 30 and 32. The bracket 28 as viewed from the front in FIG. 3 is of essentially a U-shaped configuration including inner sidewall 34, end wall 36 and outer sidewall 38.

Figure 6:
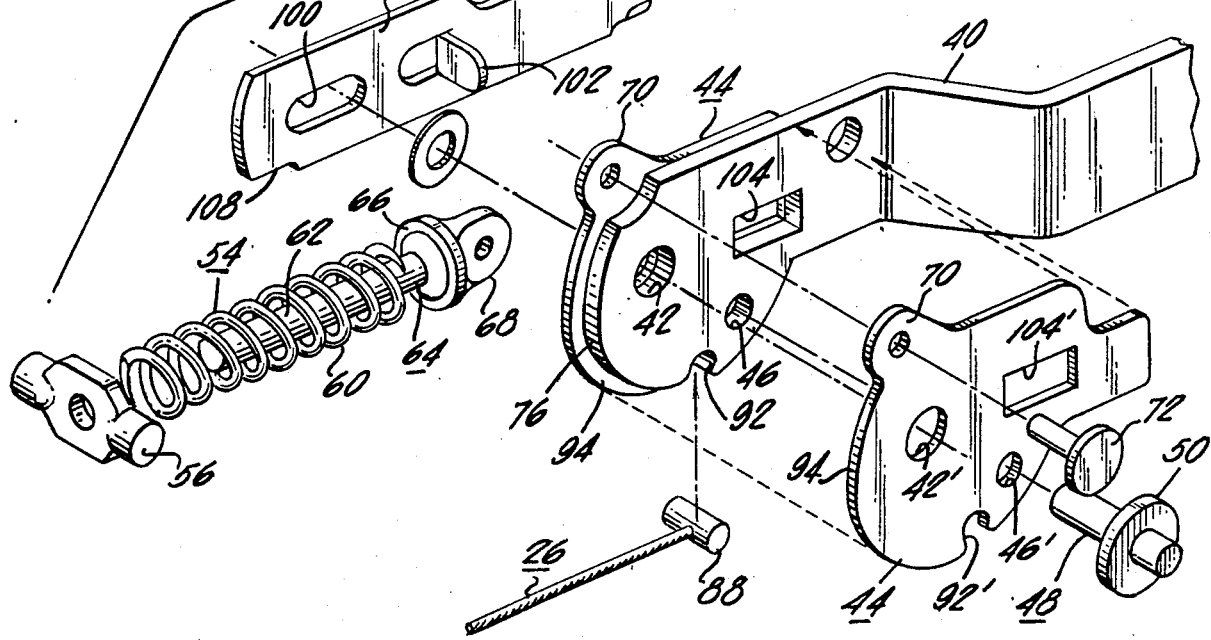
FIG. 6 is an exploded perspective view showing the several elements of the control removed from the control bracket.

The upper pivotal handle 20 includes a portion extending into the bracket 28, which portion is designated the actuating lever 40. As most readily seen in FIG. 6, the actuating lever 40 includes a bore 42 therein through which the upper bracket securing bolt 30 passes, thus providing the pivot for the actuating lever. An aligned pivotal mounting is provided on the opposite side of the handle 20.

The portion of the actuating lever 40 disposed within the bracket 28 is provided with a pair of substantially identical face plates 44 on each side thereof, which face plates are apertured at 42' to permit passage of the pivot bolt 30. An additional bore 46 in the actuating lever 40 and aligned bores 46' in the face plates 44 permit passage of a stop pin 48 which is press fitted into the bores with an annular shoulder 50 thereof engaging the face of the outermost face plate 44. The extending ends of the stop pin 48 as shown in FIGS. 3-5 ride along arcuate slots 52 in the upper ends of the bracket side plates 34 and 38. The ends of the slots 52 serve as stop means for limiting the pivotal movement of the actuating lever between a "cable relaxed" position shown in FIG. 4 and a "cable tensioned" position shown in FIG. 5, the permissible movement of the lever being slightly less than 90°.

A spring linkage 54 is pivotally connected at one end to the bracket 28 and at its opposite end to the actuating lever 40. The spring linkage includes a spring pivot pin 56, the ends of which extend through slots 58 in the bracket side plates 34 and 38. A spring 60 seated at one end on the spring pivot pin 56 extends around the shaft portion 62 of spring rod 64, seating at its opposite end against the shoulder 66 of the spring rod when under compression. An extending eye portion 68 of the spring rod is disposed between ears 70 of the actuating lever side plates 44 and is pivotally connected thereto by pivot pin 72. The spring 60 is a compression spring and is constantly in compression to exert a force on the actuating lever throughout its permissible range of pivotal movement. As may be seen from a comparison of FIGS. 4 and 5, the pivot point of connection of the spring linkage 54 to the actuating lever 40, namely the pivot pin 72, passes across the center line 74 extending through the actuating lever pivot 30 and the spring linkage pivot 56. The spring linkage will accordingly go "over center" during passage of the actuating lever from one limit position to the other. The spring linkage will thus hold the actuating lever in whichever limit position it should be placed, in addition to assisting the lever in reaching that limit position after passing over center.

The lower end of the actuating lever 40 is configured in an arcuate cam surface 76 disposed around the actuating lever pivot 30. The cam surface 76 is not centered at the actuating lever pivot, the cam surface center being displaced from the actuating lever pivot for a reason explained below.

The control cable assembly 26 is a sheathed type of cable having a sheath 78 terminating in a threaded connector 80 which as shown in FIG. 5 is adjustably attached to a cable attachment arm 82 of the bracket 28 by means of locknuts 84. The flexible cable 86 slideable within the sheath 78 terminates in a transverse pin 88 cast on the end of the flexible cable. The pin 88 is received within a slot 92 of the actuating lever at one end of the cam surface 76 and is held captive therewithin by the aligned slots 92' of the face plates 44. As shown in FIGS. 4 and 5, the cable 86 rides on the cam surface 76 of the actuating lever and is guided thereon by extending flange portions 94 of the side plates 44.

As may be seen from a comparison of FIGS. 4 and 5, in FIG. 4 the actuating lever stop pin 48 engages the ends 52a of the slots 52 of the bracket, in the cable relaxed position of the actuating lever. In this position, the cable tension is removed and the mechanism actuated by the cable, for example the mower wheel drive, is disengaged such as by clutch springs or the like. In the cable relaxed position of FIG. 4, the spring linkage 54 acts to rotate the actuating lever in a clockwise direction and accordingly holds the actuating lever in the cable relaxed position.

As the handle 20 is pivoted forwardly in the manner illustrated in FIG. 2, the actuating lever moves toward the cable tensioned position shown in FIG. 5 wherein the stop pin 48 bears against the opposite ends 52b of the bracket slots 52. In moving from the cable relaxed position to the cable tensioned position, the spring linkage passes over center and thereafter applies a counter-clockwise force to the actuating lever as shown in FIG. 5 to hold the lever in the cable tensioned position. The axial displacement of the cable obtained during movement of the actuating lever from the cable relaxed position of FIG. 4 to the cable tensioned position of FIG. 5 is illustrated at "S" in FIG. 5. Although the degree of tension applied to the cable can be adjusted by means of the nuts 84 on the cable sheath end fitting 80, the amount of cable movement is governed by the length of the slots 52 on the bracket.

The displacement of the center of the arcuate cam surface from the actuating lever pivot provides a shorter radius between the actuating lever pivot and the cam surface at the point of cable engagement as the actuating lever approaches the cable tensioned position. This increases the mechanical advantage of the actuating lever with respect to the cable as the cable approaches its maximum tension and decreases the moment arm of the cable.

In some circumstances it may be desirable to lock out the control assembly 24, for example when mowing in short back and forth strokes under bushes or trees. For this purpose, a lockout lever 96 is provided as most clearly seen in FIG. 6. The lockout lever includes an elongated platelike body portion 98 which is disposed within the bracket adjacent the actuating lever. A slot 100 in the lockout lever is provided to receive bolt 30 and permit longitudinal sliding movement of the lever over the bolt. A tang 102 extending from the lockout lever is slideably disposed within a rectangular slot 104 of the actuating lever and aligned slots 104' of the face plates 44. A handle portion 106 of the lockout lever permits sliding movement of the lever as shown in FIG. 3. A relieved portion 108 at the lower front corner of the lockout lever as shown in FIG. 4 cooperates with a lockout pin 110 extending through the bracket to prevent movement of the actuating lever when the lockout lever is advanced forwardly and downwardly to the locked position illustrated in FIGS. 3 and 4. In the unlocked position of the lever shown in FIG. 5, the lever clears the lockout pin and permits unimpeded rotation of the actuating lever.

The operation of the device is relatively simple, and involves simply the rotation of the actuating lever by grasping the upper handle 20 and rotating it forwardly to the cable tensioned positoin in the manner shown in FIG. 2. This motion of the actuating lever applies a predetermined tension to the cable 26 and, by action of the over center spring linkage 54, holds the actuating lever locking the cable at the desired tension. This locked position of the actuating lever will be maintained by the spring despite any interruption in the tension of the cable. The tensioning of the cable engages the drive mechanism for the lawn mower rear wheels 14 and the mower will commence its self-propelled operation.

To disengage the mower drive, the handle 20 is simply swung rearwardly to move the actuating lever to the cable relaxed position of FIG. 4. With the cable tension removed, the wheel drive mechanism is disengaged. The spring linkage 54 will hold the operating lever in the cable relaxed position of FIG. 4.

Should it be desired to advance the mower manually, for example for maneuvering around flowers or trees or for movement within a building, the lockout lever 96 is simply moved to the locked position shown in FIG. 3, thereby preventing rotation of the actuating lever. When engine drive is again desired, the lockout lever is simply pulled upwardly and rearwardly to the unlocked position and the control assembly is once again operative.

Manifestly, changes in details of construction can be effected by those skilled in the art without departing from the invention.

We claim:

1. A cable control assembly for tensioning a flexible cable and locking said cable in a tensioned condition, said control assembly comprising a control bracket, an actuating lever pivotally mounted on said bracket, a spring linkage pivotally mounted at one end to said bracket and at the other end to said actuating lever, an arcuate cam surface on said actuating lever disposed around the actuating lever pivot, means for connecting a cable end to said actuating lever with a portion of said cable adjacent said cable end riding on said cam surface, stop means on said bracket for limiting the pivotal movement of said actuating lever between a cable relaxed position and a cable tensioned position, the point of pivotal connection of said spring linkage to said actuating lever passing across the center line extending through said actuating lever pivot and the point of pivotal connection of said spring linkage to said bracket when said actuating lever is moved between the cable relaxed and the cable tensioned position whereby said spring linkage effects a locking of said actuating lever in either the cable tensioned or cable relaxed position.

2. The invention as claimed in claim 1 wherein the center of said cam surface is displaced from the actuating lever pivot to provide a shortening radius from the actuating lever pivot to the point of engagement of said cable with said cam surface as the actuating lever approaches the cable tensioned position.

3. The invention as claimed in claim 1 wherein said cable includes a cable sheath adjustably secured to said bracket.

4. The invention as claimed in claim 1 wherein said stop means comprises a pin on said actuating lever, and a slot on said bracket, the engagement of said pin with the ends of said slot defining the cable tensioned and cable relaxed position of said actuating lever.

5. The invention as claimed in claim 1 wherein said spring linkage comprises a compression spring.

6. The invention as claimed in claim 5 wherein said spring linkage includes a spring pivot pin pivotally mounted on said bracket, said compression spring being seated on said pivot pin, and a spring rod pivotally attached to said actuating lever, said spring being seated against said spring rod.

7. The invention as claimed in claim 1 including means for preventing rotation of said actuating lever when said lever is in the cable relaxed position, said means comprising a lockout lever slideably disposed on said actuating lever and selectively slideable to a lockout position wherein said lockout lever engages an element of said bracket thereby preventing rotation of said actuating lever.

8. A cable control assembly for selectively tensioning and locking a flexible cable in a predetermined tensioned condition or in a predetermined cable relaxed condition, said control assembly comprising a control bracket, said control bracket comprising inner and outer sidewalls, an actuating lever pivotally mounted on said bracket between said bracket sidewalls, a spring linkage disposed between said bracket sidewalls and pivotally mounted at one end to said bracket and at the other end to said actuating lever, an arcuate cam surface on said actuating lever disposed around the actuating lever pivot, means for connecting a cable end to said actuating lever with a portion of said cable adjacent said cable end riding on said cam surface, the center of said cam surface being displaced from the actuating lever pivot to provide a shortening radius from the actuating lever pivot to the point of engagement of said cable with said cam surface as the actuating lever approaches the cable tensioned position, stop means on said bracket for limiting the pivotal movement of said actuating lever between a cable relaxed position and a cable tensioned position, the point of pivotal connection of said spring linkage to said actuating lever passing across the center line extending through said actuating lever pivot and the point of pivotal connection of said spring linkage to said bracket when said actuating lever is moved between the cable relaxed and the cable tensioned position whereby said spring linkage effects locking of said actuating lever in either the cable tensioned or cable relaxed position.

9. The invention as claimed in claim 8 wherein said spring linkage includes a spring pivot pin pivotally mounted between said bracket sidewalls, said compression spring being seated on said pivot pin, and a spring rod pivotally attached to said actuating lever, said spring being seated against said spring rod.

10. The invention as claimed in claim 8 wherein said cable includes a cable sheath adjustably secured to said bracket.

11. The invention as claimed in claim 8 wherein said stop means comprises a pin on said actuating lever, and a pair of aligned slots on said bracket sidewalls, the engagement of said pin with the ends of said slots defining the cable tensioned and cable relaxed position of said actuating lever.

12. The invention as claimed in claim 8 including means for preventing rotation of said actuating lever when said lever is in the cable relaxed position, said means comprising a lockout lever slideably disposed on said actuating lever and selectively slideable to a lockout position wherein said lockout lever engages an element of said bracket thereby preventing rotation of said actuating lever.

* * * * *